Sept. 18, 1945.   H. BUTHE   2,385,058
HYDRO-MECHANICAL POWER TRANSMISSION
Filed Dec. 15, 1943   2 Sheets-Sheet 1

INVENTOR.
Henry Buthe,
BY George D. Richards
ATTORNEY.

Sept. 18, 1945.  H. BUTHE  2,385,058
HYDRO-MECHANICAL POWER TRANSMISSION
Filed Dec. 15, 1943   2 Sheets-Sheet 2

INVENTOR.
Henry Buthe,
BY
George D. Richards
ATTORNEY.

Patented Sept. 18, 1945

2,385,058

UNITED STATES PATENT OFFICE 2,385,058

HYDROMECHANICAL POWER TRANSMISSION

Henry Buthe, Cliffside, N. J., assignor to Star Engineering Company, Newark, N. J., a firm composed of Hilmer Lagergren and Vincent Oehrlein, both of Union, N. J., and Henry Buthe, Cliffside, N. J.

Application December 15, 1943, Serial No. 514,312

8 Claims. (Cl. 74—189.5)

This invention relates to improvements in hydro-mechanical power transmission mechanism of the differential type.

The invention has for an object to provide a novel hydro-mechanical power transmission mechanism comprising a power driven compound turbine operating through a dual planetary gear means to transmit power to a driven shaft, whereby the power transmitted automatically adjusts itself to variations of load through automatic shift from low gear drive, effecting maximum application of power at the expense of speed, to high gear drive, effecting maximum speed commensurate with the load, and vice versa.

The invention has for another object to provide a hydro-mechanical power transmission mechanism of the kind mentioned, wherein the turbine comprises a power driven impeller member, a primary rotor member and a secondary rotor member, the latter being subject to the drive of both the impeller member and the primary rotor member, and wherein the driven shaft and ring gear of the planetary gear set are unitary, and the planetary gear carrier is unitary with and turns with said secondary rotor member, while the sun gear of said planetary gear set is unitary with and turns with the primary rotor member, all whereby the driven shaft is differentially driven in response to varying load conditions.

Another object of the invention is to provide a hydro-mechanical power transmission mechanism of the kind mentioned, wherein all parts rotate in the direction of drive shaft rotation without back-slip or reversal.

The invention has for a further object to provide automatic means for moving the power driven impeller member of the turbine toward and from the rotor members thereof, whereby to improve starting performance, to improve flow of power under high speed conditions, and to reduce drag upon the power shaft under idling conditions, as e. g., when the power source comprises an internal combustion engine.

Other objects of this invention, not at this time more particularly enumerated, will be understood from the following detailed description of the same.

An illustrative embodiment of this invention is shown in the accompanying drawings, in which—

Figure 1:
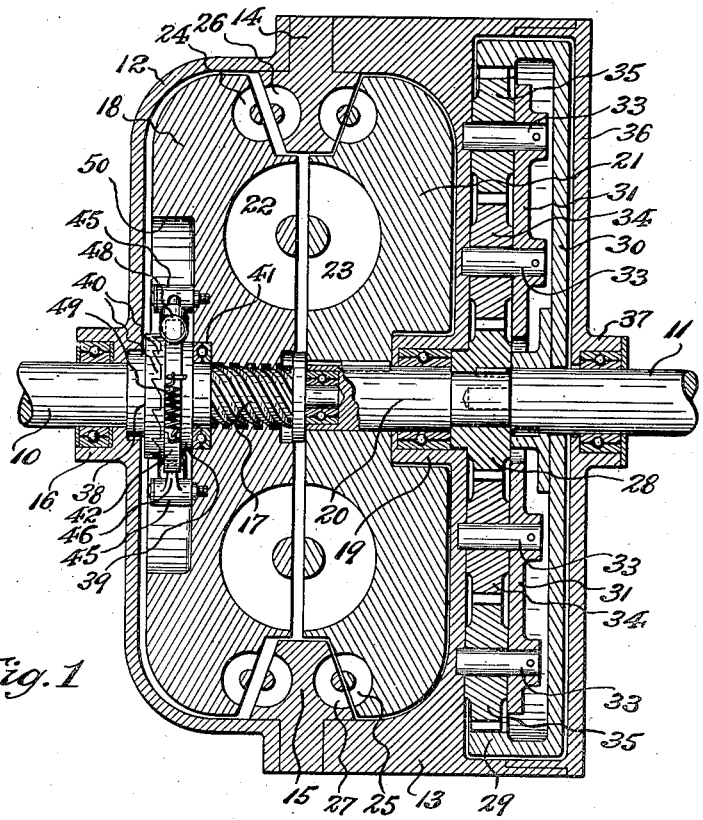
Figure 2:
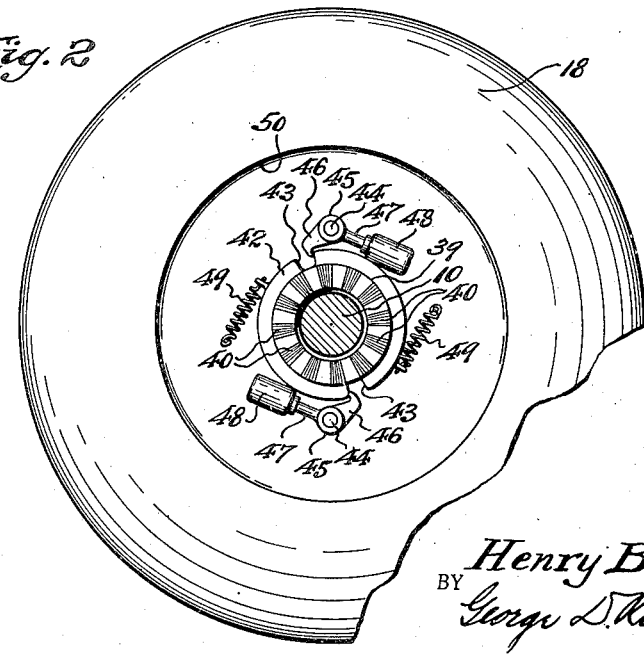

Fig. 1 is a central longitudinal section through a hydro-mechanical power transmission mechanism made according to this invention, the turbine impeller member being shown in its initial retracted or idling speed driving position; and Fig. 2 is an exterior face view of the turbine impeller member, showing the governor controlled cam means as disposed when said impeller member is in retracted position.

Figure 3:
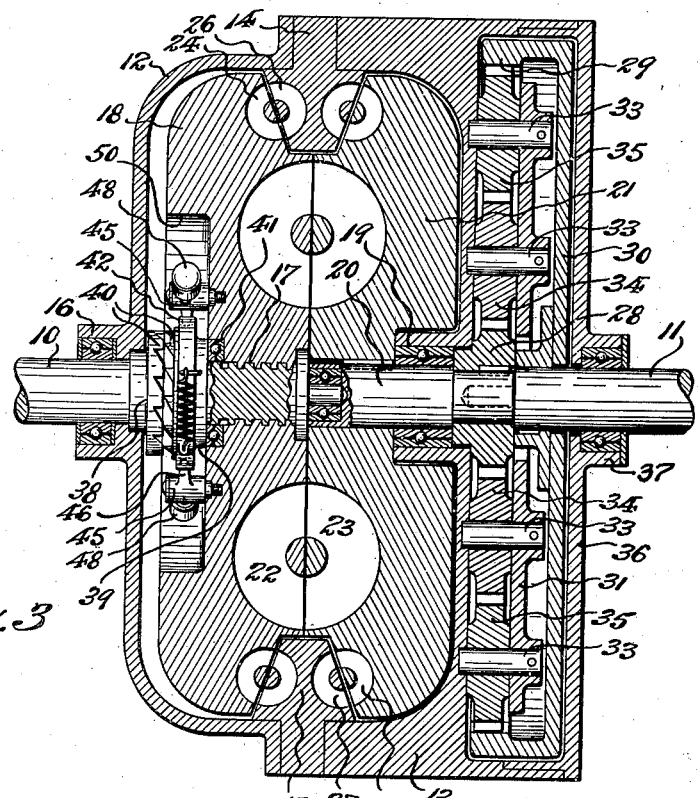
Figure 4:
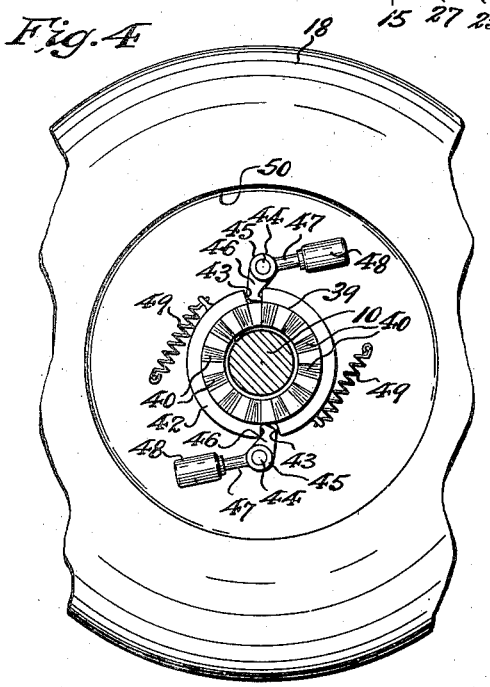

Fig. 3 is a central longitudinal section through the power transmission mechanism, the turbine impeller member being shown in its advanced high speed driving relation to the turbine rotor members; and Fig. 4 is an exterior face view of the turbine impeller member showing the governor controlled cam means as actuated to advance the impeller member into high speed driving relation to the turbine rotor members.

Figure 5:
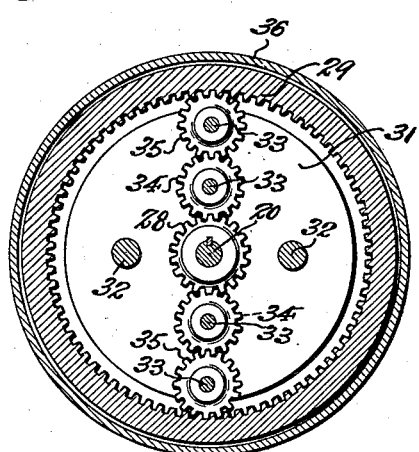

Fig. 5 is a transverse sectional view through the planetary gear set of the transmission, said view being drawn on a reduced scale.

Similar characters of reference are employed in the above described views, to indicate corresponding parts.

Referring to the drawings, the reference character 10 indicates a power shaft, which may be actuated by any suitable power source, such, e. g., as an internal combustion or other type of engine, electric motor, or the like.

The power shaft drives a driven shaft 11, longitudinally aligned therewith, through a compound turbine and associated planetary gearing; said turbine being generally of the kind known to the art as the Fottinger type turbine.

The turbine comprises a casing formed by a pair of opposed shells 12 and 13 suitably shaped internally to enclose the impeller and rotor members of the turbine. Said casing is disposed concentric to and is freely rotatable about the axis of the aligned power and driven shafts. Suitably affixed to and between said casing shells 12 and 13 is the supporting flange 14 of an annular secondary rotor member 15, which extends into and around the casing interior, the same being thus arranged to revolve with the casing.

The power shaft 10 extends into the casing interior through a suitable bearing 16 with which the casing shell 12 is provided. The inner end portion of said power shaft 10 is formed to provide a spirally splined portion 17. Keyed to the power shaft 10 by the splined portion 17, so as to be capable of moving axially back and forth thereon while nevertheless being rotated thereby, is the turbine impeller member 18.

Rotatable in a central bearing portion 19, with which the casing shell 13 is provided, is a transmission shaft 20. This transmission shaft 20 lies between the power shaft 10 and the driven shaft 11 and in axially aligned relation thereto. Keyed to said transmission shaft 20 is the primary rotor member 21 of the turbine, the same being opposed to the turbine impeller member 18. The impeller member is provided in the central portion of its face with a main radially vaned annular recess 22, and, in like manner, the primary rotor member 21 is provided in its central face portion with a main radially vaned annular recess 23 which is operatively opposed to said main radially vaned annular recess 22 of said impeller member.

The impeller member is further provided in the outlying marginal face portions thereof with an external radially vaned annular recess 24 which is concentric to but independent of said main radially vaned recess 22. In like manner, the primary rotor member 21 is also provided in the outlying marginal face portions thereof with an external radially vaned annular recess 25 concentric to but independent of its main radially vaned recess 23. The external vaned recesses 24 and 25 of the impeller and primary rotor members, respectively oppose opposite side faces of the secondary rotor member 15, and said faces of the latter are respectively provided with radially vaned annular recesses 26 and 27, to respectively oppose and cooperate with the external vaned recess 24 of the impeller member and the external vaned recess 25 of the primary rotor member.

The dual planetary gearing system of the transmission is disposed at the external side or face of the casing shell 13, and comprises a sun gear 28 which is keyed to the transmission shaft 20 so as to be unitary with and for rotation by the primary rotor member 21. The ring gear 29 is formed in connection with a carrying drum 30 which is keyed to and rotates with the driven shaft 11. A planetary pinion carrier 31 is provided so as to be unitary with and to be rotated by the casing 12—13 as actuated by the secondary rotor member 15. In the arrangement shown, the carrier 31 is joined to and spaced from the side or face wall of the casing shell 13 by connecting studs 32. Dual planetary pinions are rotatably mounted on journal pins 33 which are affixed to and between the carrier 31 and casing shell 13. Said dual planetary pinions comprise intermeshing inner and outer pinions 34 and 35, the inner pinions 34 meshing with the sun gear 28 and the outer pinions 35 meshing with the ring gear 29. The dual planetary gearing system may be enclosed, if desired, by an auxiliary chambered casing section 36 suitably affixed to the casing 12—13, and having a central bearing portion 37 through which the driven shaft 11 extends.

Means is provided for automatically advancing and retracting the impeller member 18 toward and from the primary and secondary rotor members 21 and 15. In an illustrative form of such means as shown, the same comprises a thrust cam ring 38 which is affixed to the power shaft 10 within the interior of the casing 12—13. Rotatably mounted on the power shaft 10 between said thrust cam ring 38 and the turbine impeller member 18 is a shift cam ring 39. Said cam rings have cooperating cuneate cam teeth 40 on their meeting faces. The impeller member 18 is preferably provided with an anti-friction thrust bearing 41 through which the thrust of said shift cam ring 39 is transmitted to said impeller member 18. Said shift cam ring 39 is provided with a laterally projecting flange 42 having indented notches 43 in its periphery. Pivotally mounted on fulcrum studs 44, which are affixed to the impeller member 18 to project rearwardly therefrom, are the journal hubs 45 of shift dogs 46, the noses of the latter being adapted to enter said notches 43 so as to operatively engage the flange 42 of the shift cam ring 39. Extending from the journal hubs 45 of said shift dogs 46, substantially in an opposite direction, are lever arms 47 provided at their extremities with weights 48; said weights being subject to the influence of centrifugal force, whereby to swing outward the lever arms 47 and thereby rotate the shift dogs 46, to in turn rotatably shift the shift cam ring 39 relative to the thrust cam ring 38. Spring means 49 are suitably interconnected between the shift cam ring and the body of the impeller member 18, whereby to normally urge the shift cam ring 39 to initial closed relation to the thrust cam ring 38. The external face of the impeller member 18 may be recessed, as at 50, to provide housing space for the described impeller member shifting means.

In use, the novel transmission according to this invention operates as follows:

Initially, when the prime mover actuates the power shaft 10 at idling speed, the impeller member 18 is retracted on the splined portion 17 of the power shaft to the position shown in Fig. 1, whereby said impeller member 18 is spaced away from the primary and secondary rotor members 21 and 15, thus forming a maximum gap therebetween, and consequent maximum slippage between the impeller and rotor members. Under these conditions maximum idling speed of the prime mover and power shaft is permitted without transmission of power to the driven shaft 11.

When the speed of the power shaft 10 is accelerated, the impeller member 18 will begin to impart movement to the primary rotor member 21, while at the same time the centrifugal force induced by the accelerating rotation of the impeller member 18 will become effective on the weighted lever arms 47—48, whereby to swing the shift dogs 46 so as to rotatively shift the shift cam ring 39 relative to the thrust cam ring 38, so that relative movement of their cam teeth 40 will impart a forward movement to the shift cam ring 39 which is in turn imparted to the impeller member 18 whereby to advance the latter on the splined portion 17 of the power shaft 10 toward the rotor members 21—15 to close the gap therebetween, and thus diminish slippage, until, upon attainment of a predetermined power shaft speed, complete closure of the gap occurs and maximum driving effect of the impeller member 18 upon the primary rotor member 21 is attained.

In the meantime, as the primary rotor member 21 begins to revolve, the sun gear 28 of the planetary gearing, which is driven thereby, will revolve the dual pinions 34—35, and through these the ring gear 29 in driving direction, thus transmitting actuating power to the driven shaft 11 at low gear ratio; the reduction ratio depending upon the selected relative sizes of the sun and ring gears. As the primary rotor member 21 thus operates through the planetary gearing, the impeller member 18 will at the same time operate through the outlying impeller vane sets 24—26 to impart some forward motion to the secondary rotor member 15, and through the latter to the carrier of the dual planetary pinions 34—35, thus preventing any possibility of back slip or reverse movement of the ring gear 29 and driven shaft 11 under load.

Under the maximum drive of the impeller member 18, and as load drag on the driven shaft decreases, the secondary rotor member 15 will gradually approach and finally attain a speed equal to that of the impeller member 18 and primary rotor member 21, so that the sun gear 28 and planetary pinions carrier will revolve in unison, whereupon the planetary pinions 34—35 will cease to revolve about their axes, and will become stationary and thus effective as keys to interlock the sun and ring gears together for unitary revolution, and consequently flow of power through the transmission from the power shaft 10 to the driven shaft 11 will become direct or at a one to one ratio. Under these circumstances the drive of the impeller member 18 will be effective at a maximum through both the primary and secondary rotor members 21 and 15 at high speed.

If, during high speed operation of the transmission, speed of the power shaft 10 is retarded or reduced to idling speed, the momentum of load on the driven shaft 11, effective through the planetary gearing, tends to maintain high speed of the primary and secondary rotor members 21 and 15, so that the vane sets thereof tend to transmit a forward driving force to the impeller member 18, whereby the latter tends to turn forwardly on the splined portion 17 of the power shaft 10, thus temporarily maintaining the impeller member 18 in gap closing relation to the primary and secondary rotor members, and consequently the impeller member 18 functions to exert a braking effect upon the rotor members and driven shaft, thereby retarding rotation thereof until their speed matches the reduced speed of the power shaft 10, and since the governor controlled cam rings 38—39 have resumed normal initial positions, the impeller member 18, as its speed decreases, will be shifted back along the power shaft under the compulsion of the relatively faster rotating splined portion 17 of the latter, thus retracting the impeller to its normal initial gap forming relation to the rotor members. When, after this, speed of the power shaft 10 is again accelerated, the operations above described are repeated to attain power transmission to the driven shaft 11 ascendingly from low gear low speed drive to high gear or direct high speed drive.

From the above it will be understood that a very flexible, smoothly operating, and self-acting variable speed transmission is provided; and one in which, by reason of the provision of the dual pinion planetary gearing, all parts rotate in forward direction without possibility of back slip or reversal, so that a constant driving torque is applied to and is effective upon the driven shaft at all times and at all speeds.

I am aware that many and various changes could be made in the construction and arrangement of the mechanisms and parts thereof without departing from the scope of this invention as defined by the following claims. It is therefore intended that all matter contained in the above description or shown in the accompanying drawings shall be interpreted as illustrative, and not in a limiting sense.

I claim:

1. A hydro-mechanical automatic variable speed transmission comprising a power shaft, a driven shaft, a hydraulic turbine having an impeller means and primary and secondary rotor means adapted to be independently driven by said impeller means, a spirally splined driving connection between said power shaft and said impeller means whereby the latter may be axially retracted and advanced into intermediate gap opening and closing relation to said rotor members, centrifugally actuated means for automatically controlling movements of said impeller means to and from gap closing relation to said rotor members, a planetary gear set of the intermeshed dual pinion constant forward drive type operative to transmit power from said primary rotor means to said driven shaft, said planetary gear set having rotatable carrier means to support its intermeshed planetary pinions, and said carrier means being connected with said secondary rotor means so as to revolve therewith.

2. A hydro-mechanical automatic variable speed transmission comprising a power shaft, a driven shaft, a planetary gear set of the intermeshed dual pinion constant forward drive type including a sun gear, a ring gear, and a revolvable carrier mounting intermeshing planetary pinions one of which is engaged by the sun gear and the other of which engages the ring gear, a hydraulic turbine having impeller means and primary and secondary rotor means adapted to be independently driven by said impeller means, a spirally splined driving connection between said power shaft and said impeller means whereby the latter may be axially retracted and advanced into intermediate gap opening and closing relation to said rotor members, centrifugally actuated means for automatically controlling movements of said impeller means to and from gap closing relation to said rotor members, said primary rotor member being connected in driving relation to said sun gear, said ring gear being connected in driving relation to said driven shaft, and said intermeshed planetary pinions carrier being connected with said secondary rotor means so as to revolve therewith.

3. A hydro-mechanical automatic variable speed transmission comprising a power shaft, a driven shaft, a hydraulic turbine including an impeller means adapted to be driven by said power shaft, an axially aligned primary rotor means opposed to said impeller means, opposed face portions of said impeller and primary rotor means having cooperative fluid coupling means, an annular secondary rotor means intermediate the outlying marginal portions of said impeller and primary rotor means, opposed face portions of said impeller and secondary rotor means having cooperative fluid coupling means, and opposed face portions of said primary and secondary rotor means having like cooperative fluid coupling means; a planetary gear set of the intermeshed dual pinion constant forward drive type operative to transmit power from said primary rotor means to said driven shaft, said planetary gear set having rotatable carrier means to support its intermeshed planetary pinions, and said carrier means being connected with said secondary rotor means so as to revolve therewith.

4. A hydro-mechanical automatic variable speed transmission comprising a power shaft, a driven shaft, a hydraulic turbine including an impeller means adapted to be driven by said power shaft, an axially aligned primary rotor means opposed to said impeller means, opposed face portions of said impeller and primary rotor means having cooperative fluid coupling means, an annular secondary rotor means intermediate the outlying marginal portions of said impeller and primary rotor means, opposed face portions of said impeller and secondary rotor means having cooperative fluid coupling means, and opposed face portions of said primary and secondary rotor means having like cooperative fluid coupling means; a planetary gear set of the intermeshed dual pinion constant forward drive type, including a sun gear, a ring gear, and a revolvable carrier mounting intermeshing planetary pinions one of which is engaged by said sun gear and the other of which engages the ring gear; said primary rotor member being connected in driving relation to said sun gear, said ring gear being connected in driving relation to said driven shaft, and said intermeshed planetary pinions carrier being connected with said secondary rotor means so as to revolve therewith.

5. A hydro-mechanical automatic variable speed transmission comprising a power shaft, a driven shaft, a hydraulic turbine including an impeller means, an axially aligned primary rotor means opposed to said impeller means, opposed face portions of said impeller and primary rotor means having cooperative fluid coupling means, an annular secondary rotor means intermediate outlying marginal portions of said impeller and primary rotor means, opposed face portions of said impeller and secondary rotor means having cooperative fluid coupling means, and opposed face portions of said primary and secondary rotor means having like cooperative fluid coupling means; a spirally splined driving connection between said power shaft and said impeller means whereby the latter may be axially retracted and advanced into intermediate gap opening and closing relation to said rotor members, centrifugally actuated means for automatically controlling movements of said impeller means to and from gap closing relation to said rotor members; a planetary gear set of the intermeshed dual pinion constant forward drive type operative to transmit power from said primary rotor means to said driven shaft, said planetary gear set having rotatable carrier means to support its intermeshed planetary pinions, and said carrier means being connected with said secondary rotor means so as to revolve therewith.

6. A hydro-mechanical automatic variable speed transmission comprising a power shaft, a driven shaft, a hydraulic turbine including an impeller means, an axially aligned primary rotor means opposed to said impeller means, opposed face portions of said impeller and primary rotor means having cooperative fluid coupling means, an annular secondary rotor means intermediate outlying marginal portions of said impeller and primary rotor means, opposed face portions of said impeller and secondary rotor means having cooperative fluid coupling means, and opposed face portions of said primary and secondary rotor means having like cooperative fluid coupling means; a spirally splined driving connection between said power shaft and said impeller means whereby the latter may be axially retracted and advanced into intermediate gap opening and closing relation to said rotor members, centrifugal actuated means for automatically controlling movements of said impeller means to and from gap closing relation to said rotor members; a planetary gear set of the intermeshed dual pinion constant forward drive type, including a sun gear, a ring gear, and a revolvable carrier mounting intermeshing planetary pinions one of which is engaged by said sun gear and the other of which engages the ring gear; said primary rotor member being connected in driving relation to said sun gear, said ring gear being connected in driving relation to said driven shaft, and said intermeshed planetary pinions carrier being connected with said secondary rotor means so as to revolve therewith.

7. A hydro-mechanical automatic variable speed transmission comprising a power shaft, a driven shaft, a hydraulic turbine having an impeller means and primary and secondary rotor means adapted to be independently driven by said impeller means, a driving connection between said power shaft and impeller means adapted to permit the latter to advance and retract on the former during rotation, whereby to close and open a gap intermediate the impeller means and said rotor members, centrifugally actuated means for automatically controlling movements of said impeller means to and from gap closing relation to said rotor members, a planetary gear set of the intermeshed dual pinion constant forward drive type operative to transmit power from said primary rotor means to said driven shaft, said planetary gear set having rotatable carrier means to support its intermeshed planetary pinions, and said carrier means being connected with said secondary rotor means so as to revolve therewith.

8. A hydro-mechanical automatic variable speed transmission comprising a power shaft, a driven shaft, a hydraulic turbine having an impeller means and primary and secondary rotor means adapted to be independently driven by said impeller means, a driving connection between said power shaft and impeller means adapted to permit the latter to advance and retract on the former during rotation, whereby to close and open a gap intermediate the impeller means and said rotor members, centrifugally actuated means for automatically controlling movements of said impeller means to and from gap closing relation to said rotor members, a planetary gear set of the intermeshed dual pinion constant forward drive type, including a sun gear, a ring gear and a revolvable carrier mounting intermeshing planetary pinions one of which is engaged by the sun gear and the other of which engages the ring gear, said primary rotor means being connected in driving relation to said sun gear, said ring gear being connected in driving relation to said driven shaft, and said intermeshed planetary pinions carrier being connected with said secondary rotor means so as to revolve therewith.

HENRY BUTHE.